United States Patent [19]

Krutchen

[11] 4,419,309

[45] Dec. 6, 1983

[54] POLYSTYRENE FOAM EXTRUSION INTO A FOAM ASSISTING ATMOSPHERE

[75] Inventor: Charles M. Krutchen, Pittsford, N.Y.

[73] Assignee: Mobil Oil Corporation, New York, N.Y.

[21] Appl. No.: 373,455

[22] Filed: Apr. 30, 1982

[51] Int. Cl.³ .............................................. B29D 27/00
[52] U.S. Cl. ...................................... 264/53; 264/321; 264/DIG. 15; 425/72 R; 425/817 C
[58] Field of Search ................. 264/53, DIG. 15, 321, 264/51; 425/72 R, 817 C

[56] References Cited

U.S. PATENT DOCUMENTS

| | | | |
|---|---|---|---|
| 2,774,991 | 12/1956 | McCurdy et al. | 264/53 |
| 2,998,396 | 8/1961 | Nickolls | 264/DIG. 15 |
| 3,126,432 | 3/1964 | Schurr | 264/53 |
| 3,194,854 | 7/1965 | Smith | 264/321 X |
| 3,444,283 | 5/1969 | Carlson, Jr. | 264/53 |
| 3,482,006 | 12/1969 | Carlson, Jr. | 264/53 X |
| 3,725,320 | 4/1973 | Wang | 264/DIG. 15 |
| 3,954,929 | 5/1976 | Hoenke | 264/51 |
| 4,056,587 | 11/1977 | Honkanen et al. | 264/DIG. 15 |
| 4,146,563 | 3/1979 | Ratafia et al. | 264/51 |

FOREIGN PATENT DOCUMENTS 48-24501  7/1973  Japan ......................... 264/DIG. 15

*Primary Examiner*—Philip E. Anderson
*Attorney, Agent, or Firm*—Alexander J. McKillop; Michael G. Gilman; James P. O'Sullivan, Sr.

[57] ABSTRACT

In the process of preparing a thermoplastic resin foam the improvement comprising extruding a molten resin-blowing agent combination from a high pressure region to a lower pressure atmosphere of carbon dioxide, water vapor or mixtures thereof.

19 Claims, 1 Drawing Figure

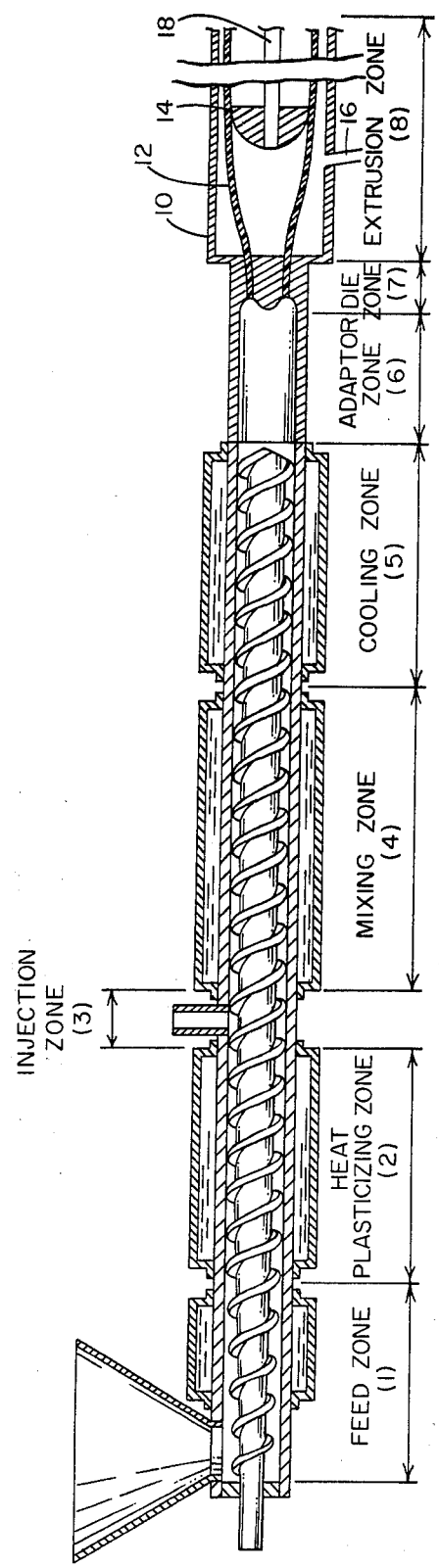

POLYSTYRENE FOAM EXTRUSION INTO A FOAM ASSISTING ATMOSPHERE

BACKGROUND OF THE INVENTION

This invention relates to the extrusion of foamed polymer compositions and more particularly to the extrusion of foamed polystyrene of improved characteristics.

In the manufacture of polystyrene foam the method wherein heated and pressurized polystyrene resin is mixed with an appropriate foaming agent and then extruded to a low pressure zone is well-known and widely used. Eventually the foam stock is subjected to a thermoforming step in the manufacture of articles such as foam cups, meat trays, snack food containers, etc. A variety of organic blowing agents have a solvating effect on polystyrene, which effect has both beneficial and adverse aspects. Blowing agents such as the lower molecular weight hydrocarbons, e.g., propane, butane, pentane, etc., and chlorofluorocarbons have such a solvating effect on polystyrene. From the standpoint of placticizing the polystyrene during the melt mixing of the same, this has a beneficial effect in that the melt can be more easily worked and mixed during the stage or stages prior to extrusion thereof. If the solvating effect is too great, deficiencies are encountered during subsequent thermoforming of the polystyrene foam. This is due to the strong affinity of such blowing agents to the polystyrene. Thus, after the foam is extruded, these blowing agents tend to remain in the cell walls of the polystyrene and, even after aging for up to several days, the polystyrene foam will tend to sag or distort prior to or during thermoforming. Therefore, the foam material produced by the above method must be aged carefully to permit evaporation of the blowing agent down to a specific level so that sagging and warping during thermoforming is avoided.

It is an object of the invention to provide a process which permits better control of residual plasticizing type blowing agent remaining in the foamed polystyrene after extrusion thereof.

It is another object of the present invention to provide a process which yields a foamed polymer of comparatively lower density.

It is still another object of the present invention to provide a process which minimizes or eliminates the need for aging foamed polystyrene prior to thermoforming.

SUMMARY OF THE INVENTION

The present invention relates to a process for preparing a thermoplastic resin foam comprising:
 (a) melting a thermoplastic resin;
 (b) introducing thereto, under pressure, a foaming agent in liquid form, said agent being a member selected from the group consisting of a low molecular weight aliphatic hydrocarbon, a low molecular weight halocarbon and mixtures thereof; and
 (c) extruding the combination directly into a lower pressure atmosphere of a member selected from the group consisting of carbon dioxide, water vapor and mixtures thereof to cause foaming of said resin. The process is also directed to the subsequent thermoforming of the extruded foam resin into articles without any substantial aging of the foamed polymer prior to thermoforming.

The present invention also relates to a continuous process for preparing a thermoplastic resin foam comprising:
 (a) feeding a thermoplastic resin to a screw-type extruder and heating the resin to a first temperature above the melting temperature of the resin;
 (b) introducing thereto, under pressure, a foaming agent in liquid form, while mixing the resin at said first temperature, said foaming agent being a member selected from the group consisting of a low molecular weight aliphatic hydrocarbon, a low molecular weight halocarbon and mixtures thereof;
 (c) cooling the mixture of molten resin and blowing agent to a second temperature below the first temperature and above the melting temperature;
 (d) extruding a sheet of said resin directly into a lower pressure atmosphere of a member selected from the group consisting of carbon dioxide, water vapor and mixtures thereof to cause foaming of said resin. Subsequently, the foamed resin may be thermoformed into articles without any substantial aging prior to said thermoforming.

BRIEF DESCRIPTION OF THE INVENTION

The FIGURE is a longitudinal sectional view of an illustrative screw extruder apparatus employed in the process of the present invention.

DETAILED DESCRIPTION OF THE INVENTION

It is to be understood that the apparatus described herein is merely for purposes of illustrating the present process. Other apparatus, more particularly suited for the preparation of the subject foamed resins, may be contemplated.

While the process of the present invention is applicable to a wide variety of thermoplastic resins, for illustration purposes it will be described with respect to amorphous linear addition polymers of ethylenically-unsaturated monomers, such as styrene, p-methylstyrene, ethylene or other alpha-olefins, acrylics, etc. The preferred materials are styrenic homopolymers or interpolymers containing a predominant amount of styrene or substituted styrene. Commercially available polystyrene, such as Dow 685, or similar general purpose resins manufactured by Mobil Chemical Company and Foster Grant, can be employed in the subject process.

The process of the present invention is described with reference to the above-identified drawing. The illustrated system is shown comprising eight distinct zones. In zone (1), hereinafter called the feed zone, the polymer charge, e.g., polystyrene, admixed with a cell size control additive or nucleation additive, e.g., citric acid and sodium bicarbonate, is introduced into the extruder and is carried forward by the action of the extruder screw to zone (2) which is the heat plasticizing zone of the extruder. In this zone, as a result of an increase in root diameter of the forwarding screw, the polymer is compacted. Simultaneously, heating fluids, which are circulated through the temperature controlled jacket which surrounds the outside surface of the extruder barrel, raise the temperature of the polymer material to effect thorough melting thereof. Next, the now molten polymer is forwarded to zone (3) of the extruder, hereinafter referred to as the injection zone, wherein the blowing agent, e.g., isopentane, is introduced into the extruder utilizing suitable means such as a injection valve. The requisite pressure to achieve introduction of the blowing agent into the molten polymer mass within the injection zone of the extruder need only be sufficiently high to overcome the pressure of the molten polymer at the point of injection into the extruder. The root diameter of the injection zone of the extruder may be either identical to the root diameter of that portion of the screw in the preceding plasticizing zone or may be somewhat less depending upon the type of extrusion equipment employed. Also, rather than injecting blowing agent at a single point in the injection zone, it may be injected at a plurality of points within the zone. Following the injection zone, the mixture of molten polymer and liquid blowing agent is advanced by rotation of the forwarding screw to zone (4) of the extruder, hereinafter referred to as the mixing zone. In the mixing zone, the liquid blowing agent-molten polymer combination is thoroughly mixed while being forwarded through the extruder to zone (5). In this zone, hereinafter referred to as the cooling zone, the forwarding screw is characterized as having a constant pitch and constant flight diameter. The extruder barrel throughout the cooling zone of the extruder is cooled by circulation of suitable cooling fluids through the temperature control jacket surrounding this portion of the extruder barrel. The cooling zone of the extruder functions to reduce the temperature of the molten polymer-liquid blowing agent mixture to a temperature at which the material within the extruder may be extruded in the form of a suitable foam structure. This is accomplished by passing the extruder charge material to zone (6), hereinafter referred to as the adaptor zone. In this zone, a more precise reading of polymer temperature is possible. From the adaptor zone, the molten mixture is passed to die zone (7) through which the material is extruded as a tubular foam sheet into the extrusion zone (8).

Extrusion zone (8) involves the crux of the present invention. This zone comprises an extrusion chamber or housing (10) which completely surrounds the extruded tubular foamed polymer and some distance downstream it is open to the ambient atmosphere so that the pressure therein is always considerably less than the pressure within the screw extrusion system proper. The drawing shows a tubular foamed extruded polymer (12) passing within chamber 10 and around a mandrel 14. The function of mandrel 14 is to at least generally assist in maintaining a substantially uniform diameter within the extruded foam polymer tube. An inlet tube or orifice (16) is a means by which a lower pressure atmosphere of carbon dioxide, water vapor or mixtures thereof is maintained completely about the external region of the extruded foamed polymer. Likewise inlet pipe or orifice 18 accommodates the introduction of the same low pressure atmosphere into the internal region of the extruded foamed polymer tube. This orifice or tube extends through the mandrel 14. The incoming force of the carbon dioxide, water or mixtures thereof must be sufficient to at least substantially expel air from the extrusion zone. The introduction of this lower pressure atmosphere is positive and continuous so that it also will continuously purge the system of expanding blowing agent emanating from the foamed polymer.

Chamber 10 of the extrusion zone need not be of any particular length. The chamber should be of a length such that the foamed polystyrene is in contact with the lower pressure atmosphere for as long a period of time as is practical. Periods of time ranging from about 2 to about 120 seconds are contemplated. For reasons not completely understood the extrusion of the foaming polymer into the defined lower pressure atmosphere results in a foamed product of significantly improved characteristics. The product is considerably less dense than the same material extruded into air at ambient pressure. In addition, the foam product can be transported directly to a thermoforming operation for the formation of articles without there being any aging time prior thereto or at least no substantial aging period of time prior to thermoforming. There also appears to be less danger of fire or explosion when using a flammable foaming agent when the treatment of the present invention is employed. Without being bound by any theory or mechanism of operation it is believed that as the foaming or blowing agent is creating the cell structure within the polymer at the point of extrusion and within a short distance thereafter, the carbon dioxide, water vapor or mixture thereof permeates or diffuses into the foaming polymer causing the improved characteristics of the resulting product.

The technique described for the extrusion of polystyrene, as indicated, is only for illustrative purposes. The process of U.S. Pat. No. 3,482,006, the disclosure of which is incorporated herein by reference, as well as any other similar process can be employed to effect the extrusion of the desired foamed polymer. Thereafter the treatment of the present invention as illustrated in extrusion zone 8 can be employed. While a mixture of sodium bicarbonate and citric acid has been disclosed as a useful nucleating agent it is to be understood that others also may be employed.

The blowing agents contemplated for use in the present invention include all known blowing agents, but particularly preferred are low molecular weight aliphatic hydrocarbons, for example, the $C_1$–$C_{10}$ hydrocarbons, for example, methane, ethane, propane, butane, n-pentane, isopentane, hexane, heptane, cyclopentadiene, etc. Also preferred are the Freons, i.e., chlorofluorocarbons. Mixtures of the aforementioned blowing or foaming agents also can be employed.

EXAMPLE

As an example of the continuously operated system according to this invention, polystyrene foam can be prepared as follows: polystyrene resin pellets can be admixed with a nucleating agent comprised of sodium bicarbonate and anhydrous citric acid. The nucleating agent can constitute 0.58% by weight based upon the total weight of the polystyrene being charged. The acid to bicarbonate ratio can be 1:076. These materials are continuously fed into a feed hopper of, for example, a 2½ inch diameter screw extruder having a L/D of 24:1. The extruder is operated at an extrusion rate of about 150 pounds per hour and the extrusion screw is internally cooled with water at a temperature of about 72° F. By means of extruder barrel heaters, the portion of the extruder barrel surrounding the feed zone of the extruder is maintained at a temperature of about 220° F. In the heat plasticizing zone, pentane injection zone, and the mixing zone, the extruder barrel is maintained at a temperature of about 400° F. to 450° F. About 5% by weight of pentane based upon the total weight of resin and nucleating agent is injected into the polystyrene composition at a point beyond the feed zone where the polystyrene is in a molten condition. The molten mass is then passed through the extruder mixing zone, a cooling zone where it is cooled to 290°–320° F., the adaptor zone and then extruded through an annular die orifice affixed to the terminal end of the extruder. The extruded polystyrene exits into the extrusion zone where it enters a chamber completely purged of air with carbon dioxide. The chamber is long enough to permit the extruded polystyrene to remain in contact with the carbon dioxide for period of from about 10 to about 30 seconds. The resultant foam polystyrene resin will have a density approximately 25% less than a similarly extruded polystyrene resin which has not been treated with the carbon dioxide atmosphere of the present invention. This material can be transported directly to a thermoforming system and effectively converted into thermoformed articles without sagging or distortion problems.

Similar results will be obtained if the carbon dioxide is replaced with water vapor or steam. In addition, the low pressure atmosphere can comprise a mixture of carbon dioxide and water vapor, e.g., a ratio of from 3:1 to 1:3 of this mixture.

What is claimed is:

1. A process for preparing a thermoplastic resin thermoformable foam in sheet form comprising:
(a) melting a thermoplastic resin;
(b) introducing thereto, under pressure, a foaming agent in liquid form, said agent being a member selected from the group consisting of a low molecular weight aliphatic hydrocarbon, a low molecular weight halocarbon and mixtures thereof; and
(c) extruding the combination in sheet form directly into a lower pressure atmosphere of a member selected from the group consisting of carbon dioxide, water vapor and mixtures thereof to cause foaming of said resin so as to expose both surfaces of said sheet to said lower pressure atmosphere.

2. The process of claim 1 wherein said lower pressure atmosphere is carbon dioxide.

3. The process of claim 1 wherein said lower pressure atmosphere is water vapor.

4. The process of claim 1 wherein said resin is a styrene polymer.

5. The process of claim 4 wherein said polymer is polystyrene.

6. The process of claim 4 wherein said polymer is poly-p-methylstyrene.

7. The process of claim 1 wherein a nucleating foam agent, in an amount effective for nucleating foam cells, is added to said resin prior to extrusion thereof.

8. The process of claim 7 wherein said nucleating agent is a mixture of citric acid and sodium bicarbonate.

9. The process of claim 1 wherein the extruded foam is thermoformed into articles without any substantial aging.

10. A continuous process for preparing a thermoplastic resin thermoformable foam in sheet form comprising:
(a) feeding a thermoplastic resin to a screw-type extruder and heating the resin to a first temperature above the melting temperature of the resin;
(b) introducing thereto, under pressure, a foaming agent in liquid form, while mixing the resin at said first temperature, said foaming agent being a member selected from the group consisting of a low molecular weight aliphatic hydrocarbon, a low molecular weight halocarbon and mixtures thereof;
(c) cooling the mixture of molten resin and blowing agent to a second temperature below the first temperature and above the melting temperature;
(d) extruding a sheet of said resin directly into a lower pressure atmosphere of a member selected from the group consisting of carbon dioxide, water vapor and mixtures thereof to cause foaming of said resin so as to expose both surfaces of said sheet to said lower pressure atmosphere.

11. The process of claim 10 wherein said lower pressure atmosphere is carbon dioxide.

12. The process of claim 10 wherein said lower pressure atmosphere is water vapor.

13. The process of claim 10 wherein said resin is a styrene polymer.

14. The process of claim 13 wherein said foaming agent is a $C_1$ to $C_{10}$ hydrocarbon or a fluoro-chlorocarbon or mixtures thereof.

15. The process of claim 14 wherein said blowing agent is pentane.

16. The process of claim 15 wherein said resin is polystyrene.

17. The process of claim 15 wherein said resin is poly-p-methylstyrene.

18. The process of claim 16 wherein a nucleating agent, in an amount effective for nucleating foam cells, is added to said resin prior to extrusion thereof.

19. The process of claim 18 wherein said nucleating agent is a mixture of citric acid and sodium bicarbonate.

* * * * *